(12) United States Patent
Kumar et al.

(10) Patent No.: US 9,779,531 B1
(45) Date of Patent: Oct. 3, 2017

(54) SCALING AND MASKING OF IMAGE CONTENT DURING DIGITAL IMAGE EDITING

(71) Applicant: Adobe Systems Incorporated, San Jose, CA (US)

(72) Inventors: Nishant Kumar, West Bengal (IN); Phaneendra Angara, Uttar Pradesh (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 0 days.

(21) Appl. No.: 15/090,359

(22) Filed: Apr. 4, 2016

(51) Int. Cl.
*G06T 11/60* (2006.01)
*G06T 3/40* (2006.01)

(52) U.S. Cl.
CPC ............. *G06T 11/60* (2013.01); *G06T 3/40* (2013.01)

(58) Field of Classification Search
CPC ....... G06T 11/60; G06K 9/00228; G06K 9/52
See application file for complete search history.

(56) References Cited

U.S. PATENT DOCUMENTS

| 5,469,536 | A * | 11/1995 | Blank | H04N 1/3873 345/594 |
| 2007/0236513 | A1 * | 10/2007 | Hedenstroem | G06T 11/60 345/634 |
| 2009/0033683 | A1 * | 2/2009 | Schiff | G06T 3/0012 345/661 |
| 2015/0009359 | A1 * | 1/2015 | Zaheer | H04N 1/6077 348/223.1 |
| 2015/0029216 | A1 * | 1/2015 | Martin | G06K 9/00228 345/626 |
| 2016/0148428 | A1 * | 5/2016 | Agarwal | H04N 5/272 345/633 |
| 2016/0189342 | A1 * | 6/2016 | Gharavi-Alkhansari | G06T 3/40 345/660 |

* cited by examiner

*Primary Examiner* — Thomas Lett
(74) *Attorney, Agent, or Firm* — Keller Jolley Preece

(57) ABSTRACT

The present disclosure is directed towards systems and methods for modifying and scaling content within a digital image. For example, systems and methods described herein involve identifying source content to add to a destination image. The source content includes one or more detected objects. The systems and methods further involve scaling the source content based on a size of one or more detected objects within the destination image. Additionally, the systems and methods involve displaying the source content within the destination image while preventing portions of the source content from interfering with one or more protected regions corresponding to the one or more detected objects within the destination image. In this way, the systems and methods enable adding source content to a destination image while minimizing manual modifications to blend the source content into the display of the destination image.

20 Claims, 7 Drawing Sheets

SCALING AND MASKING OF IMAGE CONTENT DURING DIGITAL IMAGE EDITING

BACKGROUND

Computing devices (e.g., computers, tablets, smart phones) provide numerous ways for people to capture, create, share, view, and otherwise interact with numerous types of digital content. As such, users are increasingly using computing devices to interact with and modify digital images (or simply "digital images"). For example, many computing devices enable users to edit digital images by copying and pasting portions from one digital image (a "source image") to another digital image (a "destination image") to create a composite image.

To illustrate, conventional systems allow a user to clip or cut out a selected portion of a source image and paste the clipped portion ("cutout") into a destination image. Additionally, conventional systems allow the user to resize and otherwise modify the cutout to better blend with content in the destination image. In this way, a user can make the cutout appear more natural and realistic within the destination image. Nonetheless, conventional systems suffer from various drawbacks and limitations.

In particular, combining content from multiple images generally involves manually resizing a cutout pasted into a destination image so that it more naturally fits within the surroundings of the destination image. For example, a cutout from a source image often has a different scale or size than the content within a destination image. As a result, a user generally resizes the cutout by manually enlarging or shrinking the cutout after pasting the cutout into the destination image. This is often a slow and tedious process. Further, many inexperienced users fail to resize cutouts of source images to effectively and realistically blend with the content of a destination image.

In addition to the foregoing, conventional systems require users to manually move and modify a cutout so that it does not overlap with important portions of the destination image. For example, when inserting a cutout of a person from one image into another, the user must manually move the cutout so that it does not overlap other people shown in the destination image. Furthermore, users of conventional systems generally must perform one or more manual masking steps to selectively hide unwanted content from the cutout. This procedure of manually modifying and positioning the cutout is also slow and tedious. Additionally, many users lack the experience necessary to efficiently and effectively modify the cutout in a way that produces an aesthetically pleasing resulting image.

Moreover, the frustration of the user is magnified as the user relocates a cutout from one position to another position within a destination image. In particular, due to different perceptions, depths, and backgrounds across a destination image, a user must continually resize and mask a cutout each time the user relocates the cutout within the destination image. As a result, even experienced users of conventional image editing systems experience frustration when relocating pasted content within a digital image.

Thus, there are a number of considerations to be made in systems and methods for editing digital images.

SUMMARY

One or more embodiments described herein provide benefits and/or solve one or more of the foregoing and other problems in the art with systems and methods for editing digital images. In particular, in one or more embodiments, an image editing system assists a user in pasting a portion of content from a source image into a destination image, while also facilitating proper sizing and relative positioning of the pasted portion within the destination image. For example, in response to user input, the image editing system pastes a clipped portion (or "cutout") of a person from a source image into a destination image. The image editing system can identify one or more protected regions of the destination image, such as one or more regions corresponding to people detected within the destination image. Further, the image editing system displays the clipped portion at a first position within the destination image, and resizes and/or masks the clipped portion to correspond to one or more persons within the destination image associated with (i.e., near) the first position. Additionally, the image editing system can detect a relocation of the clipped portion within the destination image from the first position to a second position. In response to the relocation, the image editing system can resize and mask the clipped portion to correspond to one or more additional detected persons within the destination image associated with the second position.

Accordingly, the systems and methods described herein reduce manual resizing and masking of source content when pasting portions of a source image into a destination image. In particular, the disclosed systems and methods automatically resize and mask a pasted portion within a destination image in a way that corresponds to sizes of detected objects near the pasted portion and in a way that doesn't obscure important regions of the destination image. Among other benefits, this improves how realistic the pasted portion looks within the destination image, as described in more detail below.

Furthermore, the systems and methods described herein reduce manual resizing, masking, and other user-modifications to a destination image when relocating a pasted portion from one position to another position within the destination image. For example, upon detecting user input that causes relocation of pasted content from a first position to a second position within a destination image, the disclosed systems and methods rescale the pasted content (e.g., from an initial size) to correspond to one or more detected objects (e.g., people) associated with the second position. Additionally, the disclosed systems and methods can automatically mask the repositioned pasted content to cause protected content within the target image to overlay or otherwise remain in the foreground of the destination image when portions of the pasted content overlap with a region of the destination image that has been identified as protected. As such, the systems and methods can enable a user to relocate and preview pasted content at different positions within a destination image while significantly reducing manual resizing, masking, and other manual modifications that cause frustration when combining content from multiple digital images.

Additional features and advantages will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and marketing features, a more particular description will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments and are not therefore to be considered to be limiting of its scope, various embodiments will be described and explained with additional specificity and detail through the use of the accompanying drawings in which.

DETAILED DESCRIPTION

Figure 1A:
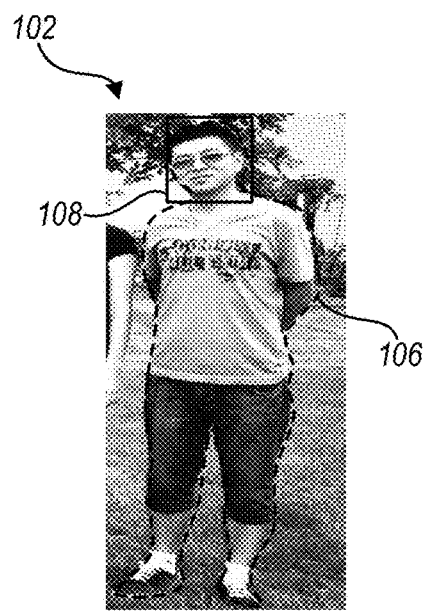
FIG. 1A illustrates an example source image including a selected cutout of a person in accordance with one or more embodiments.

The present disclosure includes one or more embodiments of an image editing system and corresponding methods for editing images by combining content from multiple images. In particular, in one or more embodiments, the disclosed image editing system adds source content (e.g., a clipped portion) from a source image to a destination image while reducing inconvenient manual modifications often necessary to improve the appearance of the added source content within the destination image. Among other uses, the techniques disclosed herein facilitate adding a cutout of a person from a source image to a destination image such that the added cutout appears realistic and natural within its surroundings in the destination image.

For example, in accordance with one or more embodiments of the present disclosure, the image editing system identifies (e.g., based on user input) a clipped portion and a destination image, into which the clipped portion will be added (e.g., pasted). The system then analyzes the clipped portion and the destination image to, for example, determine the presence, size, and/or positioning of people within the clipped portion and destination image. The image editing system can further identify one or more protected regions of the destination image (e.g., based on the determined presence and positioning of people within the destination image). In some embodiments, the image editing system creates a mask image representing the protected regions of the destination image.

Using information about content within the clipped portion and destination image, the system can display the clipped portion at a first position within the destination image (e.g., within a graphical user interface of an image editing application being used by the user). In doing so, the system automatically positions the clipped portion within the destination image to not overlap any portions of the protected regions of the destination image. Further, in one or more embodiments, the image editing system scales the clipped portion to correspond to a size or sizes of one or more objects near the first position. For example, in one or more embodiments, the image editing system scales the clipped portion so that a face within the clipped portion is sized to equal or otherwise correspond to a face within the destination image that is nearest to the first position.

In additional embodiments, the image editing system detects user input causing a relocation of the clipped portion from the first position to a second position within the destination image. In response to detecting the user input, the image editing system can display the source content at the second position. In doing so, the image editing system can again automatically position and display the clipped portion so as to not overlap any portions of the protected regions of the destination image. Furthermore, in one or more embodiments, the image editing system rescales the clipped portion to correspond to a size or sizes of one or more objects near the second position. In some embodiments, the image editing system rescales the clipped portion so that a size of a face within the clipped portion matches or otherwise corresponds to a face within the destination image that is nearest to the second position.

Accordingly, the image editing system reduces the manual input and/or expertise typically necessary to position, orient, size, and/or mask a clipped portion being added to an image. Furthermore, in accordance with the techniques disclosed herein, a user is able to more accurately blend a clipped portion into a destination image, while preserving important portions of the destination image, thereby resulting in a more realistic final product. Further, the image editing system can continuously update the size and position of the clipped portion as it is repositioned within the destination image, thereby allowing a user to quickly preview the clipped portion, in proper scale, at many different positions within the destination image, while requiring minimal time and effort on the part of the user.

As used herein, a "source image" refers to a digital image from which content is selected to add to a destination image. In one or more embodiments, the source image includes one or more objects, such as one or more faces or regions including faces to use in modifying another digital image. Additionally, while one or more embodiments described herein relate specifically to a source image including one or more faces, it is appreciated that a source image can include any number of objects other than faces that may be selected to add to a destination image. Furthermore, although this disclosure describes taking content from a source image and adding it to a separate destination image, in some embodiments, the source image and the destination image may be the same image.

As used herein, the terms "source content," "clipped portion," and "cutout" refer to a portion of a digital image (e.g., source image) to be added to another digital image (e.g., destination image) or to another area of the same digital image. The source content can refer to any portion of the source image. For example, in one or more embodiments, a clipped portion includes a region of a source image including one or more objects (e.g., a person) within the source image. In one or more embodiments, selection of the clipped portion may be at least partially automated (e.g., using facial detection, object detection, and/or auto-selection techniques). Additionally, in one or more embodiments, the clipped portion is entirely user-defined (e.g., using a clipping tool in an image editing application).

As used herein, a "destination image" refers to a digital image to be edited using the source content. For example, a destination image may refer to a digital image displayed within a graphical user interface of an image editing application, and to which a user wishes to add a clipped portion of a source image. In one or more embodiments, the destination image includes a plurality of detected objects, such as a group of people, and the source content includes an additional object or person to be displayed with the existing objects or people.

Additional features and characteristics of one or more embodiments of the image editing system are described below with respect to the Figures. In particular, FIGS. 1A-1F illustrate an example process of the image editing system adding content from a source image 102 to a destination image 104 in accordance with the principles disclosed herein. In particular, as will be described in greater detail below, the image editing system can identify a region within the source image 102 including source content 106 and add some or all of the source content 106 to the destination image 104. Additionally, as shown in FIGS. 1A-1F, the image editing system can automatically and intelligently resize, mask, or otherwise edit the source content 106 within the destination image 104 based on a position or change in position of the source content 106 within the destination image 104.

As shown in FIG. 1A, the image editing system can display the source image within a graphical user interface of an image editing application and facilitate selection of the source content 106 to be used in modifying a destination image. As a non-limiting example, in one or more embodiments, the image editing system display the source image 102 within a graphical user interface of ADOBE® PHOTOSHOP® ELEMENTS or another software application that allows users to edit digital images.

Based on user input or based on an analysis of the source image 102, the image editing system can identify the source content 106. For example, as shown in FIG. 1A, the source content 106 includes an image of a person to be clipped from the source image 102 and added to the destination image 104. In one or more embodiments, the image editing system retrieves the source image 102 from a storage or database of images stored on and/or captured using a client device. Alternatively, in one or more embodiments, the image editing system retrieves or otherwise accesses the source image 102 from a remote location (e.g., a remote server device).

In one or more embodiments, the image editing system identifies the source content 106 within the source image 102 by defining a region or cutout of the source content 106 from the source image 102. For example, in some embodiments, the image editing system analyzes the source image 102 to detect the presence of a person or other object, and then automatically identify (e.g., using edge detection techniques) a boundary of person or other object, thereby defining or selecting source content 106. In one or more additional embodiments, a user utilizes one or more controls of an image editing application to select a portion of the source image 102 (e.g., by drawing a boundary around the person using a clipping tool), and the image editing system identify the source content 106 based on the input or selection from the user. In yet further embodiments, the image editing system may automatically adjust the input received from the user to more accurately correspond to an object (e.g., person) detected within the selection made by the user.

As mentioned above, the source image 102 can include one or more identified objects. For example, the source image 102 includes one or more faces and/or bodies of people. As shown in FIG. 1A, the source image 102 includes an identified face 108 of a person within the outlined source content 106. In one or more embodiments, the image editing system detects or otherwise identifies one or more objects (e.g., face 108) within the source image 102 prior to determining source content 106 to use in modifying the destination image 104. For example, in one or more embodiments, the image editing system identifies faces and/or other objects within any number of digital images within a collection of digital images accessible to a computing device. Alternatively, in one or more embodiments, the image editing system identifies one or more objects within an identified region of source content 106 (e.g., in response to receiving a user input defining a region within the source image 102).

The image editing system can analyze the source content 106 to determine one or more features of the source content 106 and/or a person or other object within the source content 106. For example, in one or more embodiments, the image editing system identifies a size, shape, center, width, and/or height of a person or other object detected within the source content 106. Additionally, the image editing system can determine a relative location of the detected person or object with respect to other objects within the source image 102. To illustrate, and as shown in FIG. 1A, the image editing system identifies a face 108 of a person (e.g., using facial detection techniques) and provides an indication (e.g., a box) of the detected face. Further, the image editing system can analyze the detected face 108 (e.g., using various feature detection techniques) to determine any number of features associated with the face 108, such as a center and size of the face 108 and a position of different portions of the face 108 (e.g., eyes, nose, mouth).

The image editing system can also identify a profile of the face 108 and/or corresponding upper body of the person shown in the source image 102. In one or more embodiments, the image editing system identifies a respective pose of the person or profile of the face 108. For example, in one or more embodiments, the image editing system analyzes the source image 102 (e.g., using various feature analysis techniques) to determine whether (and to what degree) the person's head or body is angled left, right, backward, or forward, or whether the user is facing directly forward.

Figure 1B:
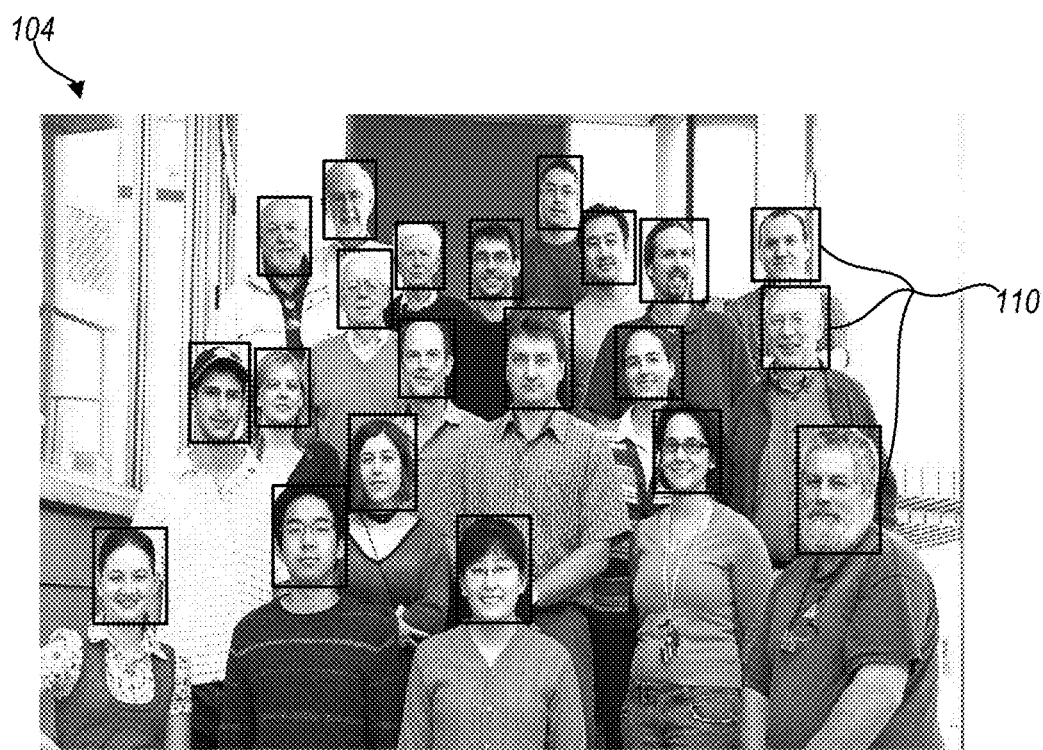
FIG. 1B illustrates an example destination image including a group of people in accordance with one or more embodiments.

Similar to the source image 102, the destination image 104 can include any number of detected objects as shown in FIG. 1B. In particular, as shown, the destination image 104 includes a group of people arranged in rows of varying positions and depths within the destination image 104. The image editing system can detect or otherwise identify a plurality of faces 110 or bodies corresponding to the plurality of people. While one or more embodiments described herein relate to detecting faces and/or people within digital images, it is appreciated that the image editing system can similarly identify other types of objects in both the source image 102 and the destination image 104. For example, in one or more embodiments, the image editing system identifies animals, plants, buildings, vehicles, or other types of objects in the source image 102 and/or the destination image 104.

As mentioned, the destination image 104 includes the faces 110 of a plurality of people. Similar to the detected face 108 of the source image 102, the image editing system can identify any number of features associated with each respective face of the destination image 104. For example, in one or more embodiments, the image editing system identifies a size, center, length, width, position, or other feature associated with each of the detected faces 110 and/or bodies of the people in the destination image 104. Additionally, in one or more embodiments, the image editing system identifies a respective pose for each person within the destination image 104.

Further, based on the analysis of the source content 106 and destination image 104, the image editing system identifies or determine one or more regions of the destination image 104 that are important and should be protected when adding the source content 106 to the destination image 104. For example, as described above in connection with FIG. 1B, the image editing system detects the faces 110 of the people shown in the destination image 104. Additionally, in one or more embodiments, the image editing system detects a portion or all of each person's body. For example, in some embodiments, the image editing system identifies an outline of each person's upper body and face. It is appreciated that the image editing system can identify or determine which regions of the destination image 104 are important based on various criteria. For example, in one or more embodiments, the image editing system determines whether faces, profiles (including both faces and upper bodies), or entire bodies of individuals within the destination image should be protected based on a detected number of individuals within the destination image. For example, in one or more embodiments, where a destination image 104 includes fewer people, the image editing system determines that entire bodies or entire profiles should be protected. Alternatively, in one or more embodiments, where the destination image 104 includes more than a threshold number of people, the image editing system determines that only faces should be protected. Further, in one or more embodiments, the image editing system receives a user input defining portions of the destination image (or portions of detected people) that should be protected.

Additionally, the image editing system can classify the identified regions corresponding to the people in the destination image 104 as protected regions of the destination image 104. Using this information, the image editing system can ensure that the protected regions are not unduly altered by the addition of the source content 106 to the destination image 104 (e.g., to ensure that the source content 106 does not overlap or otherwise obscure the protected regions).

Figure 1C:
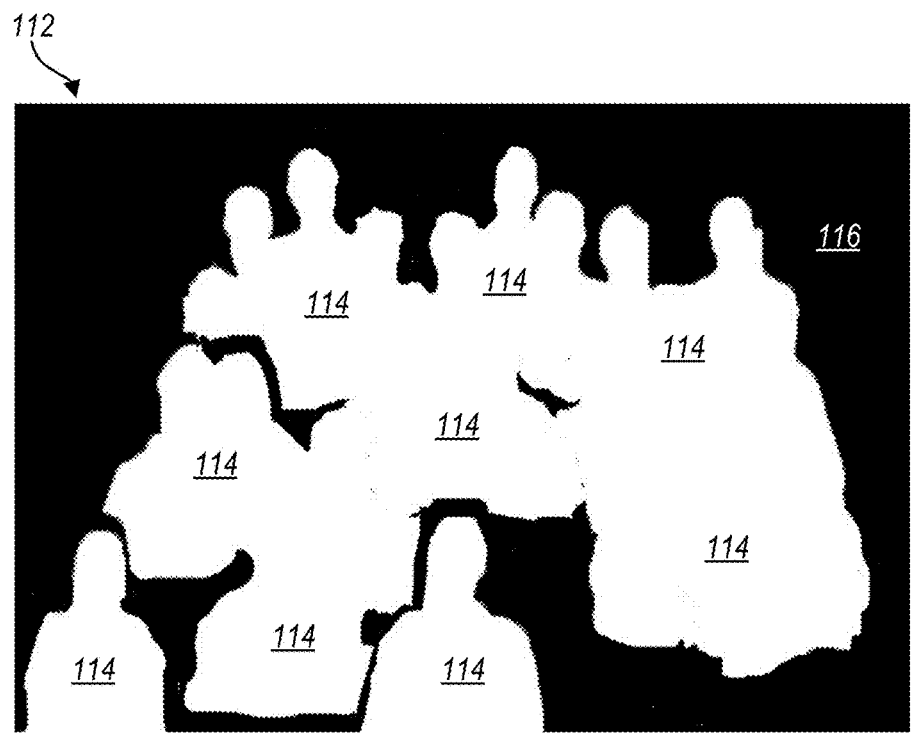
FIG. 1C illustrates an example mask image of the destination image of FIG. 1B in accordance with one or more embodiments.

In one or more embodiments, the image editing system identifies the protected regions of the destination image 104 by calculating a mask image for the destination image 104. For example, as shown in FIG. 1C, the image editing system generates a mask image 112 that includes a binary representation of the destination image 104 including black and white pixels corresponding to protected and unprotected portions of the destination image 104. As shown, the mask image 112 includes white pixels corresponding to protected regions 114 representing the upper-body profiles for the people in the destination image 104. Additionally, the mask image 112 includes black pixels corresponding to an unprotected region 116 and associated with portions of the destination image 104 that do not include people.

Although the mask image 112 represents the upper-body profiles of the people in the destination image, one will appreciate that in alternative embodiments, the mask image 112 represents any other portions of the people (e.g., only faces) or the entire bodies of the people shown in the destination image 104. In one or more additional embodiments, the mask image 112 includes protected and unprotected regions corresponding to other objects or properties detected within the destination image 104 or otherwise classified as foreground content within the destination image 104. Once the mask image 112 is generated, the image editing system can utilize the mask image 112 to protect the protected regions 114, as will be explained in more detail below.

Figure 1D:
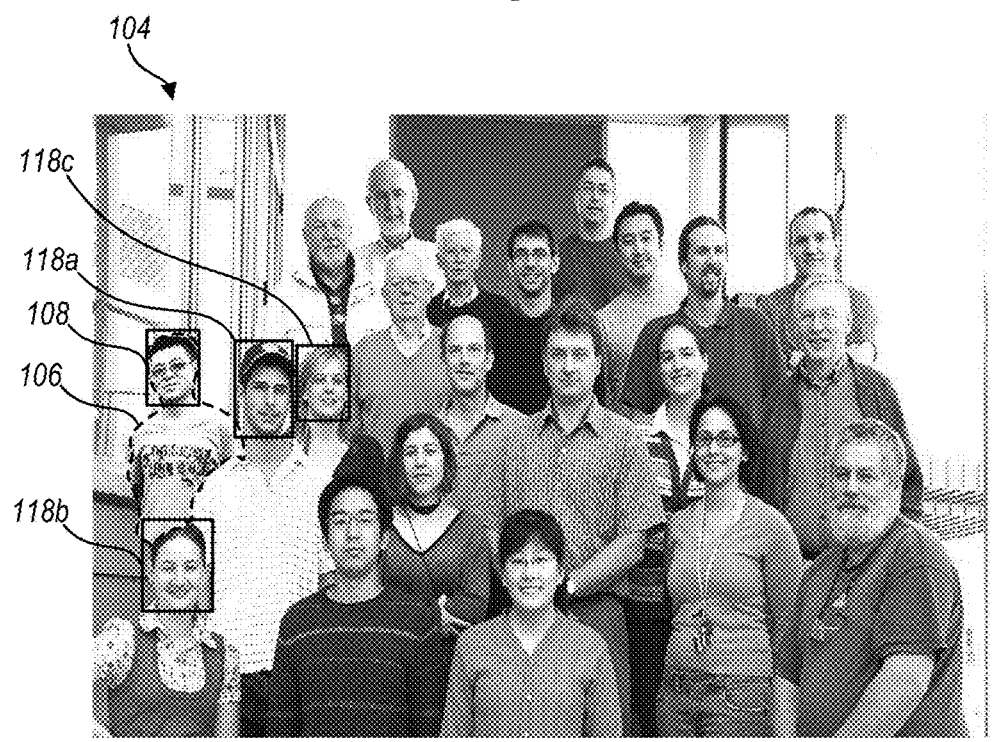
FIG. 1D illustrates the destination image of FIG. 1B including the cutout from the source image of FIG. 1A at a first position in accordance with one or more embodiments.

As mentioned above, the image editing system can allow a user to edit the destination image 104 by adding the source content 106 to the destination image 104. In particular, in response to user input, the image editing system can paste the source content 106 within the destination image 104. For example, as shown in FIG. 1D, the destination image 104 includes the source content 106 from the source image 102 displayed at an initial position along the left side of the destination image 104.

In one or more embodiments, the image editing system intelligently displays the source content 106 within the destination image 104. For example, in one or more embodiments, the image editing system 106 selects an initial position for the source content 106 to best fit its surroundings within the destination image 104 without interfering with the protected regions of the destination image 104. To illustrate, in one or more embodiments, the image editing system positions the source content 106 at an initial position and masks one or more portions of the source content 106 so as to not overlap with the protected regions of the destination image 104, as shown in FIG. 1D.

The image editing system can identify the initial position for the source content 106 using various constraints or criteria. For example, in one or more embodiments, the image editing system identifies portions of the destination image 104 where the source content would not intersect or otherwise overlap any pixels of the protected regions 114 of the mask image 112. Additionally, in one or more embodiments, the image editing system identifies locations nearby one or more people within the destination image 104 that share a similar pose as the person shown in the source content 106. For example, in one or more embodiments, the image editing system compares the pose of the person shown in the source content 106 with detected poses of people shown in the destination image 104 (e.g., using existing object comparison techniques) to identify whether one or more people in the destination image 104 have a similar pose (e.g., angle or direction) as the person shown in the source content 106.

In further embodiments, the image editing system identifies locations within the destination image 104 where placement of the source content 106 would not cause any portion of the source content 106 to fall outside the destination image 104 (e.g., thereby keeping the source content 106 within or away from the edges of the destination image 104). For example, in one or more embodiments, the image editing system scans the destination image 104 and compares portions of the unprotected region 116 within the destination image 104 to a footprint or size of the source content 106 (e.g., using existing size or space comparison techniques) to identify locations within the destination image 104 that could fit the source content 106 without overlapping the protected regions 114 and without causing a portion of the source content 106 to fall off the side of the destination image 104. Further, where the destination image 104 does not include an initial position that satisfies all constraints, the image editing system can prioritize various constraints and/or find a position that satisfies most of the constraints.

For example, as an alternative to placing the source content 106 at a position that does not overlap any portion of the protected regions 114, one or more embodiments of the image editing system places the source content 106 at a position that partially overlaps the protected regions, but then intelligently masks the source content so as to not interfere with a display of the protected regions. For instance, as shown in FIG. 1D, the image editing system prevents the source content 106 from interfering with the protected regions 114 of the destination image 104 by masking portions of the source content 106 that would overlay, cover, or otherwise interfere with the protected regions. Thus, the image editing system can cause the source content 106 to blend into the destination image 104 by masking or displaying the source content 106 in a way that appears like it is overlapped by or behind one or more protected regions (e.g., one or more other people) within the destination image 104.

As illustrated in FIG. 1D, the image editing system places the source content 106 within the destination image 104 without covering one or more detected faces 118a-118c or associated body profiles of nearby people in the destination image 104. In particular, as shown in FIG. 1D, the source content 106 overlaps the body profile associated with a first nearby face 118a and another body profile associated with a second nearby face 118b. As described above, each of the profiles for the first nearby face 118a and the second nearby face 118b are included within the protected regions 114 of the destination image 104. As such, the image editing system prevents the source content 106 from interfering with a display of the protected regions 114 associated with the first nearby face 118a and the second nearby face 118b by causing the portion of the source content 106 that overlaps the profiles and associated nearby faces 118a-118b to be masked by the protected regions 114 of the destination image 104. As such, the overlapping portion of the source portion 106 is not displayed over the protected regions 114 of the destination image.

In addition to preventing the source content 106 from interfering with the protected regions 114 of the destination image 104, the image editing system intelligently scales the source content 106 to correspond to associated content within the destination image 104. In particular, the image editing system scales the source content 106 including the detected face 108 to correspond to (e.g., to be similar to) a size of one or more nearby people or objects within the destination image 104. For example, as shown in FIG. 1D, the image editing system scales the source content 106 such that a size of the face 108 within the source content 106 is equal or substantially similar to one or more of the nearby faces 118a-118c within the destination image 104.

In determining which of the faces in the destination image 104 to use in scaling the source content 106, the image editing system can determine a relative position between the face 108 of the source content 106 and each of the faces (e.g., faces 110) within the destination image 104. In particular, the image editing system can determine a distance between a center of the face 108 of the source content 106 and a center for each of the other faces within the destination image 104. In one or more embodiments, the image editing system determines the relative position from the face 108 to the detected faces 110 of the destination image 104 by calculating a Euclidean distance (e.g., a linear distance) between a center of the face 108 and each of the other faces. Alternatively, in one or more embodiments, the image editing system determines the relative position from the face 108 to the other faces of the destination image 104 by calculating a horizontal, vertical, or diagonal position for each of the face 108 and other faces.

In one or more embodiments, the image editing system determines which of the other faces within the destination image 104 has a position corresponding to or otherwise associated with the position (e.g., initial position) of the source content 106. In particular, the image editing system can determine which of the other faces has a position closest to the initial position of the face 108 by calculating or otherwise identifying which of the other faces has the lowest Euclidean distance from the initial position of the face 108. For example, as shown in FIG. 1D, the image editing system determines that three nearby faces 118a-118c are the closest faces to the face 108 of the source content 106, and that a first nearby face 118a is the closest.

In response to determining that the first nearby face 118a is the closest of the detected faces 110 within the destination image 104, the image editing system can scale or alter any dimension of the source content 106 to match or otherwise correspond to the size of the closest nearby face 118a. For example, in one or more embodiments, the image editing system scales the source content 106 such that the face 108 has the same size as the first nearby face 118a. Alternatively, the image editing system scales the source content 106 such that the face 108 has an identical height, width, area, or other facial dimension as the first nearby face 118a within the destination image 104.

As an alternative to scaling the source content 106 based on the nearest detected face of the destination image 104, the image editing system can scale the source content 106 based on multiple nearby faces 118a-118c to an initial position of the face 108 of the source content 106. In particular, the image editing system can identify a defined number (e.g., three) of nearby faces 118a-118c and calculate an average size of the nearby faces 118a-118c to use in scaling the source content 106. For example, in one or more embodiments, the image editing system calculates an average face size for the nearby faces 118a-118c and scales the source content 106 such that the face 108 of the source content 106 has a size corresponding to the average size for the nearby faces 118a-118c.

In one or more embodiments, rather than calculating a general average for each of a number of nearby faces 118a-118c, the image editing system calculates a weighted average based on a relative position of each of the nearby faces 118a-118c to the initial position of the source content 106 (e.g., a position of the face 108 of the source content 106). For example, the image editing system scales the source content 106 to more closely correspond to the first nearby face 118a while still considering the sizes of the second nearby face 118b and the third nearby face 118c. As shown in the example destination image 104 of FIG. 1D, the image editing system calculates a weighted average that weights the first nearby face 118a more heavily than a second (next closest) nearby face 118b, which is weighted more heavily than a third nearby face 118c having a position further away from the face 108 than the first and second nearby faces 118-b.

In addition, or as an alternative to scaling the source content 106 based on a defined number of nearby faces 118a-118c, the image editing system can scale the source content 104 to correspond to any number of nearby faces 118*a*-118*c* within a threshold distance of the initial position of the source content 106. For example, as mentioned above, the image editing system calculates a distance (e.g., Euclidian distance) between the face 108 of the source content 106 and each of the detected faces 110 within the destination image 104 and identify each of the detected faces 110 within a threshold distance from the initial position of the face 108. Further, the image editing system can scale the source content 106 to correspond to a general average, weighted average, or other metric of the nearby faces 118*a*-118*c*, similar to one or more embodiments described herein.

While one or more embodiments described herein relate specifically to scaling the source content 106 based on a Euclidean distance from the face 108 of the source content 106 to one or more detected faces 110 within the destination image 104, the image editing system can additionally or alternatively scale the source content 106 based on a horizontal, vertical, or diagonal position of the detected faces 110 relative to the face 108 of the source content 106. For example, in one or more embodiments, the image editing system scales the source content 106 to correspond to the size of one or more of the detected faces 110 that overlaps or has a position on a horizontal axis that passes through the center of the face 108. As a further example, the image editing system identifies which of the previously identified nearby faces 118*a*-118*c* has the closest horizontal position as the horizontal position of the face 108 of the source content 106 and scale the source content 106 such that the face 108 has a similar size. For instance, in one or more embodiments, the image editing system determines that the third nearby face 118*c* is positioned closest to the horizontal position of the face 108 and scale the source content 106 based on the third nearby face 118*c*.

Moreover, one or more embodiments described above in connection with scaling the source content 106 based on a linear distance (e.g., Euclidean distance) between the one or more detected faces 110 (e.g., nearby faces 118*a*-118*c*) and the face 108 of the source content 106 similarly apply to a relative horizontal or vertical position of the detected faces 110 and the face 108 of the source content 106. For example, in one or more embodiments, the image editing system scales the source content 106 to correspond to one of the detected faces 110 having the closest horizontal position to the face 108 of the source content. As another example, the image editing system scales the source content 106 such that the face 108 corresponds to an average (or weighted average) of a defined number of the detected faces 110 close to the horizontal position to the face 108 of the source content 106. As a further example, the image editing system scales the source content 106 such that the face 108 corresponds to any number of detected faces 110 having a horizontal position within a threshold distance to the horizontal position of the face 108 of the source content 106.

Thus, the image editing system can scale the source content 108 when placed within the destination image 104 in accordance with an initial position of the source content 108 relative to any number of detected faces 110 within the destination image 104. In one or more embodiments, the image editing system scales the source content 108 based on a Euclidean distance between the face 108 of the source content 106 and one or more nearby faces 118. Alternatively, in one or more embodiments, the image editing system scales the source content 106 based on a vertical, horizontal, or other positional axis of one or more detected faces 110 relative to the face 108 of the source content 106.

Figure 1E:
FIG. 1E illustrates the destination image of FIG. 1B including the cutout from the source image of FIG. 1A at a second position in accordance with one or more embodiments.
Figure 1F:
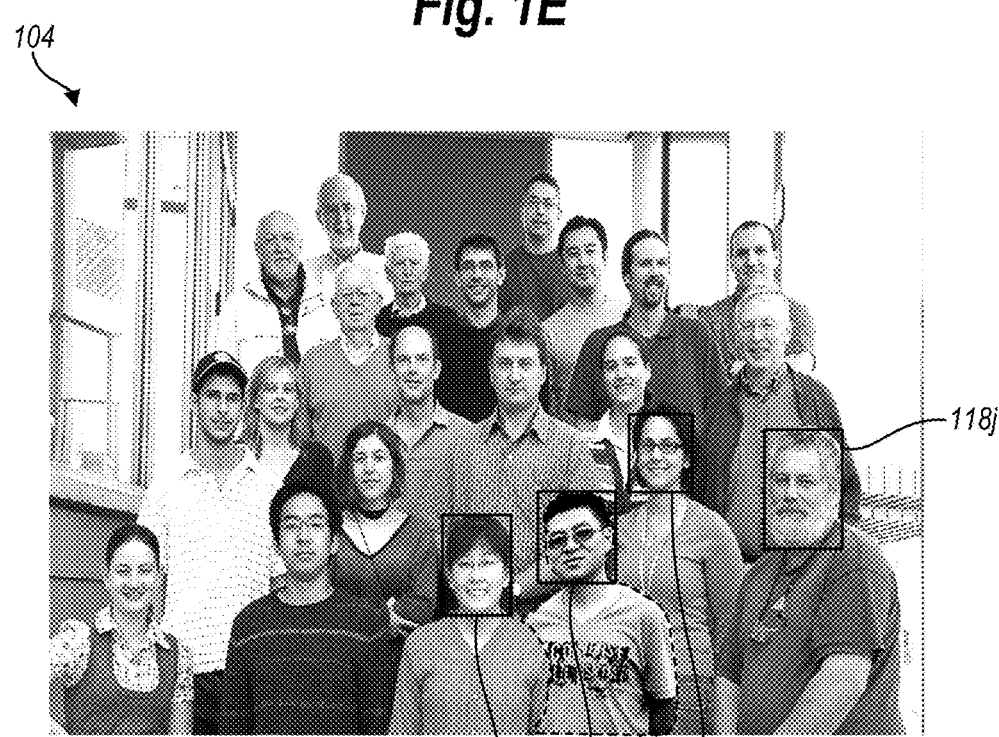
FIG. 1F illustrates the destination image of FIG. 1B including the cutout from the source image of FIG. 1A at a third position in accordance with one or more embodiments.

In addition to scaling the source content 106 when placed at the initial position within the destination image 104, the image editing system can further enable a user to relocate the source content 106 from the initial position to another position within the destination image 104. In particular, a user can select the source content 106 and manually move the source content 106 from the initial position to another position within the destination image 104. For example, in one or more embodiments, a user selects the source content 106 positioned at a first location as shown in FIG. 1D and move the source content 106 to a second location as shown in FIG. 1E. Additionally, as shown in FIGS. 1E-1F, the user can move the source content 106 from the second location to a third location. It is appreciated that the user can move the source content any number of times to any position within the destination image 104.

Upon detecting a relocation of the source content 104 from a first position (e.g., initial position) to a second position within the destination image 104, the image editing system can rescale the source content 106 to correspond to the new position within the destination image 104. In particular, the image editing system can rescale the source content 106 to correspond to one or more of the detected faces 110 within the destination image 104 that have a position associated with the new position of the source content 106. For example, as shown in FIG. 1E, the image editing system rescales the source content 106 to correspond to a size of one or more nearby faces 118*d*-118*g* based on a proximity of the nearby faces 118*d*-118*g* relative to the new position of the source content 106. Additionally or alternatively, the image editing system rescales the source content 106 to correspond to a size of one or more of the detected faces 110 that have a similar horizontal or vertical position as the relocated source content 106. For example, the image editing system rescales the source content 106 such that the face 108 within the source content 106 corresponds to a size of one or both of the nearby faces 118*f*-118*g* on the same horizontal axis (or otherwise sharing a similar horizontal position) as the face 108 of the source content 106.

In one or more embodiments, the image editing system rescales the source content 106 upon completing the relocation of the source content 106 to the second position. For example, in response to detecting a user input selecting and moving the source content from the first position as shown in FIG. 1D to the second position as shown in FIG. 1E, the image editing system rescales the source content 106 from a first size shown in FIG. 1D to the second size shown in FIG. 1E. In particular, as shown in FIGS. 1D-1E, in response to detecting that a user input has relocated the source content 106 from the first position to the second position, the image editing system rescales the source content 106 from a larger size corresponding to the size of nearby faces 118*a*-118*c* associated with the first position to a smaller size corresponding to the size of nearby faces 118*d*-118*f* associated with the second position.

In one or more embodiments, the image editing system incrementally rescales the source content 106 to correspond to incremental positions of the source content 106 between the first and second position within the destination image 104. In particular, where a user input involves input that causes the source content 106 to move along a path between the first position and the second position, the image editing system dynamically rescales the source content 106 to correspond to one or more of the detected faces 110 associated with different positions along the path between the first position and the second position. For example, a user input may include user selection and movement (e.g., click and drag) of the source content 108 that causes to the source content 108 to move along a user-defined path between the first position and the second position. In response to the user input, the image editing system can incrementally rescale source content 106 at different points along the user-defined path (e.g., prior to the user completing the user input including the selection and movement).

In one or more embodiments, the image editing system incrementally rescales the source content 106 in response to detecting a change in the one or more detected faces 110 that are closest to the moving source content 106. In particular, as the source content 106 moves from a first position to a second position within the destination image 104, the face 108 of the source content 106 changes positions relative to one or more of the detected faces 110. During this movement of the source content 106 from the first position to the second position, the image editing system can detect that a new face of the detected faces 110 is the closest face to the present position of the face 108 of the source content 106 and rescale the source content 108 in response to detecting that the new face is the closest to the moving source content 106. Alternatively, rather than rescaling based on the size of the nearest face, the image editing system can similarly rescale based on an average (or weighted average) of a set number of the detected faces 110 nearest the present position of the moving source content 106. Thus, in response to detecting a change in one or more of a defined number of detected faces 110 closest to the present position of the face 108 of the source content 106, the image editing system can incrementally rescale the source content 106 at different points between the first position and the second position within the destination image 104.

Additionally, in one or more embodiments, the image editing system incrementally rescales the source content 106 in accordance with one or more of the detected faces 110 that come within or fall outside a threshold distance of face 108 of the source content 106 as the source content 106 moves between the first position and second position of the destination image 104. For example, as shown in FIG. 1D, where nearby faces 118a-118c each fall within a threshold distance of the face 108 of the source content 106, movement of the source content 106 toward the second position shown in FIG. 1E may initially cause the second nearby face 118b to fall outside a threshold distance from the face 108. In response to detecting that the second nearby face 118b falls outside the threshold distance from the face 108, the image editing system can rescale the source content 106 based on the size of other nearby faces 118a, 118c while excluding the size of the second nearby face 118b.

Additionally, as the source content 106 moves toward the second position, other faces of the detected faces 110 will come within a threshold distance of the face 108 of the moving source content 106. As such, the image editing system can rescale the moving source content 106 in response to detecting one or more of the detected faces 110 coming within the threshold distance of the face 108 of the moving source content 104. For example, as the source content moves toward the second position within a threshold distance of the nearby faces 118d-118f shown in FIG. 1E, the image editing system rescales the moving source content 106 to reflect the size of the detected faces 110 between the first position and the second position as the detected faces 110 fall in and out of a threshold distance from the face 108 of the moving source content 104.

As another example, rather than rescaling immediately upon detecting each change in a relative position between the source content 106 and one or more of the detected faces 110, the image editing system rescales the moving source content 106 at defined time intervals as the source content 106 moves between different positions. For instance, in one or more embodiments, the image editing system determines a relative position and rescales the source content based on the size of one or more detected faces 110 every ¹⁄₁₀th of a second (or other defined time interval) while the source content 106 is moving. In particular, the image editing system can determine a relative position and rescale the source content at each defined time interval throughout the duration of the user input selecting and moving the source content 106.

Additionally, in one or more embodiments, the image editing system incrementally rescales the source content 106 at defined increments of movement. In particular, rather than rescaling the source content 106 at defined time intervals or upon detecting a change in relative position of the detected faces 110, the image editing system can incrementally rescale the source content 106 upon detecting that the source content 106 has moved within the destination image 104 by a predetermined distance (e.g., Euclidian distance). For example, in one or more embodiments, the image editing system determines that the source content 106 has moved across a predefined number of pixels or a predefined percentage of the destination image 104 and rescale the source content 106 at each defined distance interval that the source content 106 has moved.

As another example, the image editing system incrementally rescales the source content 106 upon detecting movement between defined sections of the destination image 104 (e.g., between the first position and second position of the destination image 104). For instance, in one or more embodiments, the image editing system associates the destination image 104 with a grid or other mapping of the destination image 104 that groups portions of the destination image 104 into defined sections. Thus, in response to detecting movement of the source content 106 (or face 108 of the source content 106) from one section (e.g., grid section) to another, the image editing system can incrementally scale the source content based on a relative position of the detected faces 110 from the present section associated with the moving source content 106.

As another example, the image editing system assigns a particular size of a face or other objects to each of the defined sections of the destination image 104. For example, the image editing system can generate a pixel grid (e.g., 20×20 pixels, 50×50 pixels) of the destination image 104 and calculate a distance or position of each of the detected faces 110 with regard to each of the boxes of the pixel grid. The image editing system can further associate a particular face size to each box of the pixel grid. Thus, when source content 106 is placed at a position within the destination image 104 associated with a box of the pixel grid, the image editing system can scale the source content 106 based on a face size already associated with the particular box of the pixel grid.

Additionally, in one or more embodiments, the image editing system scales or rescales the source content 106 based on movement of the source content between boxes of the pixel grid. For example, as the face 108 of the source content 106 moves from a first box of the pixel grid to a second box of the pixel grid, the image editing system rescales the source content 106 such that the size of the face 108 is rescaled from a first size associated with the first box to a second size associated with the second box. Thus, the image editing system can rescale the source content 106 based on any number of pre-calculated face sizes corresponding to individual boxes of the pixel grid.

In addition to resizing the source content 106 at different positions throughout the destination image 104, the image editing system can additionally display the source content while preventing the source content from interfering with a display of the destination image 104 corresponding to the protected regions 114. For example, upon relocating the source content 104 from the first position as shown in FIG. 1D to the second position as shown in FIG. 1E, the image editing system masks the portion of the source content 106 that overlaps the protected regions 114 of the destination image 104 associated with nearby faces 118d-118f. In particular, as shown in FIG. 1E, the source content partially overlaps portions of nearby faces 118d-118e. Thus, the image editing system can mask the source content 106 and/or cause the nearby faces 118d-118e and associated profiles to overlay the portion of the source content 106 overlapping the protected regions 114 of the destination image 104 associated with the nearby faces 118d-118e.

In one or more embodiments, the image editing system updates the masking of the source content 106 at each incremental position between the first position and second position of the destination image 104. For example, the image editing system causes any portion of the source content 106 that overlaps the protected regions 114 to be masked or displayed behind the protected regions 114 while the source content 106 is moving between the first and second position. Alternatively, the image editing system can provide a preview of the incrementally rescaled source content 106 over the protected regions 114 as the source content moves between positions, and subsequently mask source content 106 to be masked or displayed behind the protected regions 114 upon arrival at the second position (e.g., upon detecting an end of a user input moving the source content 106).

Similar to one or more embodiments described in connection with moving the source content 104 from the first position to the second position, the user moves the source content 106 from the second location to any number of locations. For example, as shown in FIG. 1F, the user moves the source content 106 from the second position to a third location. Similar to one or more embodiments described herein, the image editing system rescales the source content 106 in accordance with a position of the face 108 in relation to one or more nearby faces 118h-118k. For example, the image editing system rescales the source content 106 incrementally while the source content 106 moves between the second position and the third position. Additionally, similar to one or more embodiments described herein, the image editing system intelligently masks the relocated source content 106 (e.g., using the mask image 112) at the third position without interfering with a display of the destination image 104 corresponding to the protected regions 114.

In one or more embodiments, the image editing system causes the source content 106 to be displayed without interfering with the protected regions 114 of the destination image 104 in accordance with a default setting that causes the source content 106 to be masked or displayed behind the protected regions 114 of the destination image 104. In particular, a default setting for displaying the source content 106 may cause any portion of the source content 106 that overlaps with the protected regions 114 of the destination image 104 to be masked or displayed behind the protected regions 114. For example, as shown in FIG. 1F, a portion of the source content 106 that overlaps with the protected regions 114 is displayed as if behind the profile associated with the nearby face 118h to the left of the source content 106.

Additionally, the image editing system can provide one or more features to enable a user to override the default setting causing the source content 106 to be masked or displayed behind one or more selective portions of the protected regions 114. For example, in one or more embodiments, the image editing system provides one or more selectable options to enable portions of the source content 106 to be displayed over one or more sections of the protected regions 114. In one or more embodiments, a user selectively overrides the protected regions 114 by selecting or otherwise indicating one or more of the detected faces 110 or profiles associated with the portion of the protected regions 114 displayed over the source content 106. In response to receiving the selection to override the protected region, the image editing system cause the overlapping portion of the source content 106 to be displayed as part of the foreground of the destination image 104 (e.g., over the protected regions 114).

For example, as shown in FIG. 1F, a user selects a portion of the protected regions 114 corresponding to the nearby face 118i to the upper-right of the face 108 of the source content 106 and select or otherwise indicate an option to display the source content 106 over the portion of the protected regions 114 corresponding to the nearby face 118i. Thus, as illustrated in FIG. 1F, while the source content 106 is masked or displayed behind the protected region corresponding to the nearby face 118h to the left of the source content 106 (e.g., in accordance with a default setting), the source content 106 is displayed over the protected regions 114 corresponding to the nearby face 118i to the upper-right of the source content 106 (e.g., in accordance with a selection to override the default setting). Moreover, it is appreciated that a user can selectively override any individual portion (or multiple portions) of the protected regions 114 corresponding to one or more detected faces 110 and associated profiles.

Figure 2:
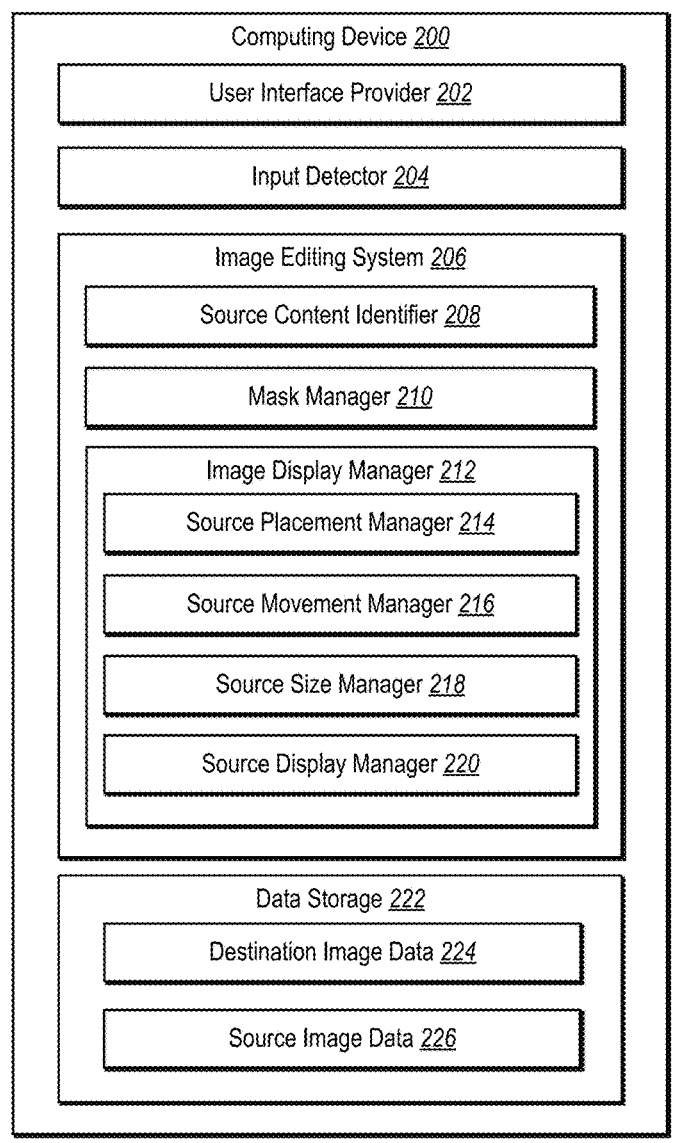
FIG. 2 illustrates a schematic diagram of an example architecture of an image editing system in accordance with one or more embodiments.

FIG. 2 illustrates an architecture of an example image editing system 206. In particular, FIG. 2 illustrates a computing device 200 having a user interface provider 202, input detector 204, and image editing system 206 including a source content identifier 208, a mask manager 210, and an image display manager 212. As shown in FIG. 2, the image display manager 212 includes a source placement manager 214, a source movement manager 216, a source size manager 218, and a source display manager 220. Further, as shown in FIG. 2, the computing device 220 includes a data storage 222 including destination image data 224 and source image data 226.

Each of the components 202-222 of the computing device 200 may be in communication with one another using any suitable communication technologies. In addition, although the components 202-222 are shown separately in FIG. 2, any of the components 202-222 may be combined into fewer components, such as into a single component, or divided into more components as may serve a particular embodiment. In addition, the components 202-222 may be located on, or implemented by, one or more computing devices, such as one or more client devices and/or one or more server devices.

Each of the components 202-222 can comprise software, hardware, or both. For example, in one or more embodiments, each of the components 202-222 comprise one or more instructions stored on a computer-readable storage medium and one or more processors of one or more computing devices to execute instructions. When executed by the one or more processors, the computer-executable instructions cause the computing device 200 to perform the methods described herein. Alternatively, the components 202-222 can comprise hardware, such as a special purpose processing device to perform a certain function or group of functions.

As shown in FIG. 2, the computing device 200 includes a user interface provider 202. The user interface provider 502 can provide a graphical user interface (or simply "user interface") that allows a user to view, navigate, browse, interact with, or otherwise experience electrical content using the computing device 200. For example, the user interface provider 202 provides a user interface that include a display of a digital image stored or otherwise accessible to the computing device 200. Likewise, the user interface provider 202 can provide a user interface that facilitates interaction with a displayed digital image. As an example, the user interface provider 202 provides a display of a source image 102 and a destination image 104 within a graphical user interface of an image editing application. Additionally, the user interface provider 202 can display the destination image 104 including identified source content 106 from the source image 104 included within the destination image 104.

As further illustrated in FIG. 2, the computing device 200 includes an input detector 204. In one or more embodiments, the input detector 204 detects, identifies, and/or receives a user interaction and translates the user interaction into a user input (e.g., a user command or request). As mentioned above, a user input can refer to a single input, or combination of inputs, received from the user by way of one or more input devices.

The input detector 204 can detect a user input from a keyboard, mouse, touch screen, or other input device as part of a communication with the computing device 200. In the event a touch screen is used as an input device, the input detector 204 can detect one or more touch gestures (e.g., swipe gesture, tap gesture) that the user provides via the touch screen. For example, in one or more embodiments, the user provides one or a combination of user inputs selecting source content 106 displayed within a destination image 108 and moving the source content 106 from a first position to a second position within the destination image 108. As another example, the user provides one or a combination of user inputs defining a boundary within a source image 102 or otherwise identifying source content 106 to use in modifying the destination image 104.

The user interface provider 202 can utilize user input and/or other data received from the input detector 204 to manage, control, and/or facilitate the use of a user interface. In general, in response to the input detector 204 detecting one or more user interactions, the user interface provider 202 provides a user interface that allows the user to view, navigate, browse, interact with, modify, or otherwise experience electronic content using the client device. For instance, as explained herein, in response to receiving a user input selecting and moving source content 106 within a destination image 104, the user interface provider 202 provides a user interface that displays within the destination image 104 the source content 106 at a different location within the destination image 104.

As mentioned above, and as illustrated in FIG. 2, the computing device further includes an image editing system 206. The image editing system 206 can facilitate modification of a destination image 104 using source content 106 from a source image 102 while preventing the source content 106 from interfering with a protected region of the destination image 104. Additionally, the image editing system 206 can further scale and rescale the source content 106 to a size that corresponds with one or more detected objects (e.g., faces) within the destination image 104. As such, the image editing system 206 includes various features and functionality to enable a user to modify a destination image 104 with source content 106 while effectively and efficiently blending the source content 106 together with the background and foreground of the destination image 104.

As shown in FIG. 2, the image editing system 206 includes a source content identifier 208. In one or more embodiments, the source content identifier 208 identifies a region, area, or portion of a source image 102 for use in modifying a destination image 104. For example, as described above, the source content identifier 208 receives a selection of a face or other object within a source image 102 and identify source content 106 corresponding to the selection to use in modifying the destination image 104. Alternatively, in one or more embodiments, the source content identifier 208 receives one or more user inputs defining a boundary or cutout of the source content 106 to add to the destination image 104. For example, a user composes a boundary by drawing a box, circle, or otherwise outlining a portion of the source image 102 to identify a user-defined area of source content 106 to add to the destination image 104.

As shown in FIG. 2, the image editing system 206 further includes a mask manager 210 that identifies a protected regions 114 of the destination image 104. In particular, the mask manager 210 can detect faces or other objects similar to an object within the source content 106 within the destination image 104. Additionally, the mask manager 210 can define or otherwise identify a portion of the destination image 104 that is protected and has a higher priority than source content 106 that is placed within the destination image 104.

In one or more embodiments, the mask manager 210 identifies the protected regions 114 of the destination image 104 by generating an image mask 112 including a protected regions 114 and an unprotected region 116. For example, the mask manager 210 generates an image mask 112 including a binary representation of the destination image 104 including a protected regions 114 corresponding to positions of a plurality of detected faces or other objects within the destination image 104. In one or more embodiments, the mask manager 210 generates a protected regions 114 including individual sections that correspond to each of the plurality of detected faces or other objects within the destination image 104.

As shown in FIG. 2, the image editing system 206 further includes an image display manager 212 that manages display of the destination image 104 and source content 106 within the destination image 104. For example, upon identifying source content 106 to use in modifying the destination image 104 and further identifying a protected regions 114 within the destination image 104 corresponding to detected faces or other objects, the image display manager 212 manages a display of the destination image 104 including the source content 106. In particular, as described herein, the image display manager 212 manages a display of the source content 106 within the destination image 104 that involves scaling and masking the source content 106 to enhance the overall quality of the modified destination image 104.

As shown in FIG. 2, the image display manager 212 includes a source placement manager 214 that places the source content 106 at an initial position within the destination image 104. In one or more embodiments, the source placement manager 214 places the source content 106 at a position within the destination image 104 that does not overlap or otherwise interfere with the protected regions 114 of the destination image 104. Alternatively, the source placement manager 214 may place the source content 106 at an initial position that causes a portion of the source content 106 to overlap the protected regions 114, but preventing the face 108 or other detected object within the source content 106 from specifically overlapping or otherwise interfering with one or a plurality of detected faces or other objects within the protected regions 114. For example, in one or more embodiments, the source placement manager 214 places the source content 106 to the side of the protected regions 114 of the destination image 104.

As shown in FIG. 2, the image display manager 212 includes a source movement manager 216 that facilitates movement of the source content 106 between different positions of the destination image 104. For example, the source movement manager 216 receives a user input selecting and moving the source content 106 within the destination image 104. In response to receiving the user input, the source movement manager 216 causes the source content 106 to move throughout the destination image 104 in accordance with a user-defined path of movement.

As shown in FIG. 2, the image display manager 212 includes a source size manager 218 that scales and rescales the source content to correspond to one or more detected faces or other objects within the destination image 104. For example, the source size manager 218 initially scales the source content 104 to correspond to one or more detected faces 110 that have a position within the destination image 104 associated with the initial position of the source content 104 placed within the destination image 104. In particular, the source size manager 218 can scale the source content 104 such that a face 108 within the source content 104 has the same or otherwise corresponding size as one or more detected faces 110 that are positioned near the initial position of the source content 104.

In addition to scaling the source content 106 when placed at an initial position within the destination image 104, the source size manager 218 can further rescale the source content 106 upon detecting a relocation of the source content 106 from a first position to a second position within the destination image 104. For example, as described above, the source movement manager 216 facilitates movement of the source content 106 from a first position to a second position. In response to detecting a relocation of the source content 106 to the second position, the source size manager 218 can rescale the source content 106 from the initial size at the first position to a new size that corresponds to one or more different detected faces 110 nearby or otherwise associated with the second position within the destination image 104. For example, the source size manager 218 rescales the source content such that a face 108 within the source content 104 has the same or otherwise corresponding size as one or more detected faces 110 that are positioned near the second position of the source content 104.

In one or more embodiments, the source size manager 218 incrementally rescales the source content 106 while moving between one or more positions of the destination image 104. For example, the source size manager 218 incrementally rescales the source content 106 to correspond to one or more detected faces 110 within the destination image 104 at different positions along the path that the source content 106 moves from the first position to the second position. It is appreciated that the source size manager 218 can rescale the source content 106 any number of times while the source content 106 moves from the first position to the second movement.

As shown in FIG. 2, the image display manager 212 further includes a source display manager 220 that prevents the source content 106 from interfering with a display of the protected regions 114 of the destination image 104. For example, the source display manager 220 causes a portion of the source content 106 to be masked or displayed behind the protected regions 114 of the destination image 104. In particular, upon detecting that a portion of the source content 106 overlaps a portion of the protected regions 114, the source display manager 220 causes the source content 106 overlapping the protected regions 114 to be masked or displayed behind or in the background of the protected region.

In one or more embodiments, the source display manager 220 causes the source content 106 to be masked or displayed behind the protected portion 114 when placed at an initial position or relocated position within the destination image 104. Additionally, the source display manager 220 can cause the source content 106 to be masked or displayed behind the protected portion 114 while the source content 106 is moving between positions of the destination image 104. Alternatively, in one or more embodiments, the source display manager 220 causes the source content 106 to be displayed over the protected region while the source content 106 is moving, but causes any portion of the source content 106 overlapping the protected regions 114 to be masked or displayed behind the protected regions 114 upon completing the relocation of the source content 104.

In one or more embodiments, the source display manager 220 provides one or more options for a user to selectively override a setting causing the source content 106 to be displayed in the background of the protected regions 114 of the destination image 104. For example, in one or more embodiments, the source display manager 220 provides a selectable option to the user to select a section of the protected regions 114 (e.g., corresponding to a detected face 110) and cause a portion of the source content 114 overlapping the section of the protected regions 114 to be displayed in the foreground (e.g., over the protected regions 114) of the destination image 104.

As mentioned above, and as shown in FIG. 2, the computing device 200 further includes a data storage 222 including destination image data 224. In particular, the destination image data 224 includes any information associated with one or more digital images to be modified using the image editing system 206. For example, the destination image data 224 includes an identification of any number of detected objects (e.g., faces 110) and information associated with each of the detected objects. For instance, the destination image data 224 includes a size, center, width, height, and/or location of any number of detected objects within a destination image 104. Additionally, in one or more embodiments, the destination image data 224 includes an identification of a protected regions 114 and unprotected region 116 for any number of digital images.

In addition, as shown in FIG. 2, the data storage 222 includes source image data 226. In particular, the source image data 226 includes any information associated with one or more digital images to be used in modifying another digital image using the image editing system 206. For example, in one or more embodiments, the source image data 226 includes an identification of one or more detected objects (e.g., face 108) and information associated with the one or more detected objects. For instance, the source image data 226 includes a size, center, width, height, and/or location of one or more detected objects within the source image 102. Additionally, in one or more embodiments, the source image data 226 includes an identification of source content 106 within a source image 102 to be used in modifying a destination image 104.

Figure 3:
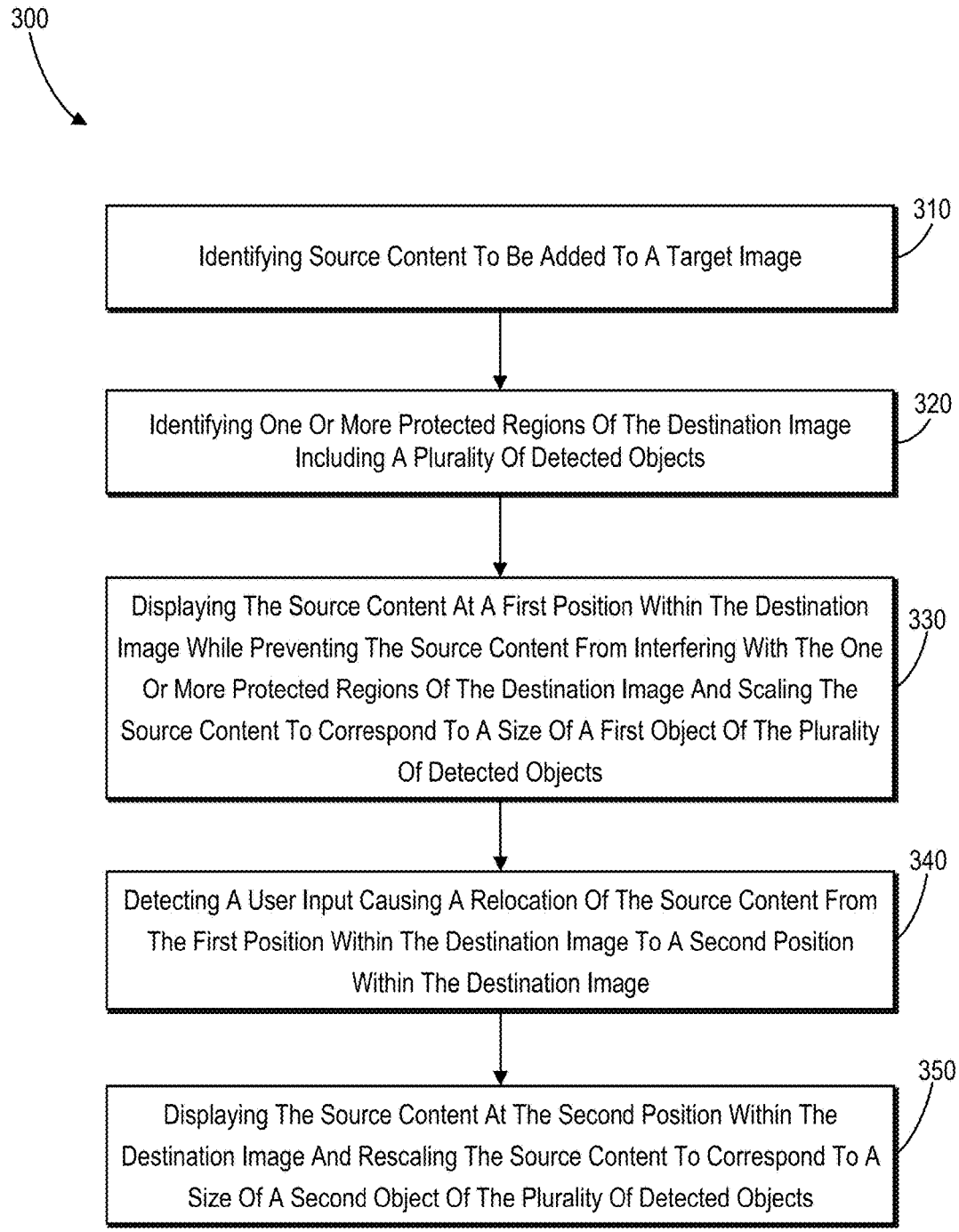
FIG. 3 illustrates a flowchart of a series of acts in a method of editing a digital image in accordance with one or more embodiments.
Figure 4:
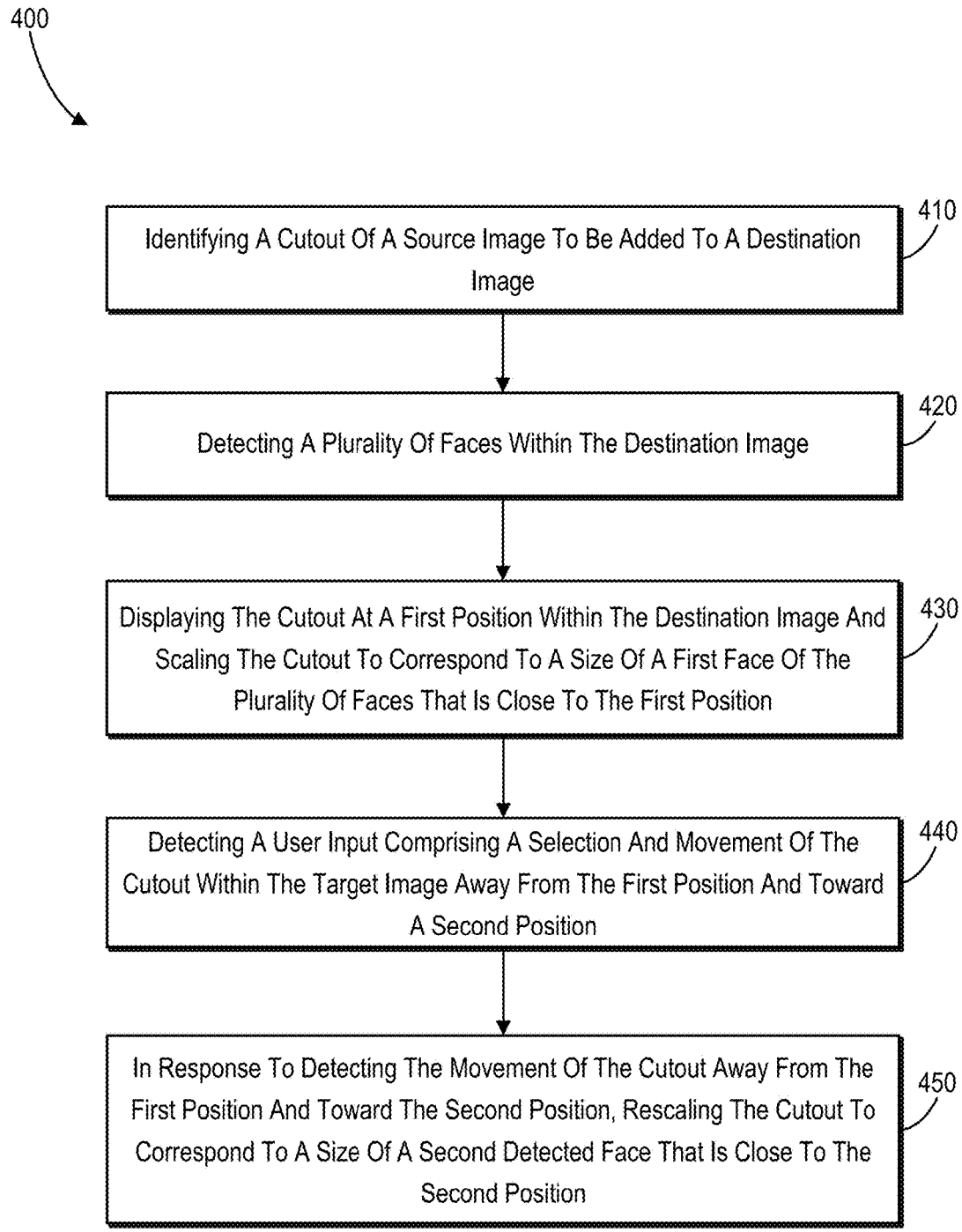
FIG. 4 illustrates a flowchart of a series of acts in another method of editing a digital image in accordance with one or more embodiments.

FIGS. 1A-2, the corresponding text, and the examples, provide a number of different systems and devices that enable an image editing system 206 to modify a digital image by placing source content 106 from a source image 102 within a destination image 104 displayed within a graphical user interface of an image editing application. In addition to the foregoing, one or more embodiments can also be described in terms of flowcharts comprising acts and steps in a method for accomplishing a particular result. For example, FIGS. 3-4 illustrate flowcharts of exemplary methods in accordance with one or more embodiments. The methods described in relation to FIGS. 3-4 may be performed with less or more acts or the acts may be performed in differing orders. Additionally, the acts described herein may be repeated or performed in parallel with one another or in parallel with different instances of the same or similar acts.

FIG. 3 illustrates a flowchart of one example method for scaling and masking content that is combined within a digital image. While FIG. 3 illustrates example steps according to one embodiment, other embodiments may omit, add to, reorder, and/or modify any of the steps shown in FIG. 3. One or more steps shown in FIG. 3 may be performed by any of the components illustrated in computing device 200 illustrated in FIG. 2.

As shown in FIG. 3, the method 300 includes an act 310 of identifying source content 106 from a source image 102 to use in modifying a destination image 104. For example, in one or more embodiments, the act 310 involves identifying source content 106 from a source image 104 to use in modifying the destination image 104, the source content 106 including an identified object. In one or more embodiments, identifying the source content 106 involves receiving a user-defined boundary identifying a region of the source image 102 to use in modifying the destination image 104. Alternatively, in one or more embodiments, identifying the source content 106 involves receiving a selection of an object (e.g., face 108) within the source image 102 and identifying an area surrounding the selected object to use in modifying the destination image 104.

As shown in FIG. 3, the method 300 further includes an act 320 of identifying a protected regions 114 of the destination image 104 including a plurality of detected objects (e.g., faces 110). For example, in one or more embodiments, the act 320 involves identifying, by at least one processor and within the destination image 104, a protected regions 114 of the destination image 104, the protected regions 114 of the destination image 104 including a plurality of detected objects. In one or more embodiments, identifying the protected regions 114 involves identifying a plurality of profiles including faces 110 and associated upper bodies of people within the destination image 104. Further, in one or more embodiments, identifying the protected regions 114 involves classifying the plurality of faces 110 and associated upper bodies of people within the destination image 104 as protected content of the destination image 104.

Additionally, in one or more embodiments, identifying a protected regions 114 of the destination image 104 involves generating a mask of protected content that identifies portions of the destination image 104 associated with the plurality of detected objects. For example, in one or more embodiments, identifying the protected regions 114 involves generating a mask image 112 that identifies a protected regions 114 of the destination image 104 corresponding to a plurality of detected faces 110 within the destination image 104. In one or more embodiments, generating the mask involves generating a binary representation of the destination image 104 including a protected regions 114 and unprotected region 116 of the destination image 104.

As shown in FIG. 3, the method 300 further includes an act 330 of displaying the source content at a first position within the destination image 104 while preventing the source content 106 from interfering with the protected regions 114 of the destination image 104 by scaling the source content 106 to correspond to a size of a first object of the plurality of detected objects. For example, in one or more embodiments, displaying the source content involves displaying, by the at least one processor and within a graphical user interface of an image editing application, the source content at a first position within the destination image while preventing the source content from interfering with the protected region of the destination image. Further, displaying the source content at the first position includes scaling the source content to correspond to a size of a first object of the plurality of detected objects where the first object is associated with the first position.

Thus, the method 300 includes displaying the source content while preventing the source content 106 from interfering with the protected regions 114 of the destination image. Additionally, in one or more embodiments, the method 300 includes determining that a portion of the source content 106 at the first position overlaps a portion of the protected regions 114 of the destination image. Additionally, displaying the source content can involve causing the portion of the source content 106 that overlaps the portion of the protected regions 114 to be masked or displayed behind the portion of the protected regions 114 of the destination image 104.

Further, where the method 300 includes masking or displaying a portion of the source content 106 behind the protected regions 114 of the destination image 104, the method 300 can further include providing a selectable option to override a setting causing the portion of the source content 106 that overlaps the portion of the protected regions 114 to be masked or displayed behind the portion of the protected regions 114 of the destination image 104. In response to receiving the selection of the selectable option, the method 300 can further include causing the portion of the source content 106 that overlaps the portion of the protected regions 114 to be displayed over the portion of the protected region of the destination image 104.

Moreover, in addition or as an alternative to enabling a user to override a setting causing the portion for the source content 106 to be displayed over a portion of the protected regions 114, the method 300 can further include enabling a user to selectively override the default setting with regard to individual sections of the protected regions 114. For example, in one or more embodiments, the method 300 includes identifying, within the portion of the protected regions 114 that overlaps the portion of the source content 106, multiple sections of the protected regions 114 corresponding to respective objects of the plurality of detected objects. Additionally, the method 300 can include providing, for each of the multiple sections of the protected regions 114, a selectable option to selectively override a setting causing the portion of the source content 106 to be masked or displayed behind a corresponding section of the multiple sections of the protected regions 114. The method 300 can further include a receiving a selection of a first selectable option corresponding to a first section of the multiple sections of the protected regions 114. In response to receiving the selection of the first selectable option, the method 300 can further involve causing the portion of the source content 106 that overlaps the first section of the protected regions 114 to be displayed over the first section of the protected regions 114 of the destination image 104.

As mentioned above, and as illustrated in FIG. 3, displaying the source content 104 involves scaling the source content 106 to correspond to a size of a first object of the plurality of detected objects where the first object is associated with the first position. Additionally, in one or more embodiments, displaying the source content 104 involves scaling the source content 106 such that the identified object of the source content has a size corresponding to the size of the first object of the plurality of objects. For example, where the object within the source content 106 includes a detected face 108, displaying the source content 106 involves scaling the source content 106 such that the face 108 within the source content 106 has a size corresponding to the size of one or more detected faces 110 within a plurality of faces 110 detected within the destination image 104.

Additionally, in one or more embodiments, displaying the source content 104 involves scaling the source content 106 based on a relative position between the identified object of the source content 106 and one or more of the plurality of identified objects of the destination image 104. For example, in one or more embodiments, displaying the source content 106 at the first position within the destination image 104 involves scaling the source content 106 based on a Euclidean distance between the identified object of the source content 106 and the first object of the plurality of detected objects. As another example, in one or more embodiments, displaying the source content 106 at the first position within the destination image 104 involves scaling the source content 106 based on a difference in horizontal, vertical, or diagonal position between the identified object of the source content and the first object of the plurality of detected objects.

Additionally, as shown in FIG. 3, the method 300 includes an act 340 of detecting a user input causing a relocation of the source content 106 from the position within the destination image 104 to a second position within the destination image 104. In one or more embodiments, detecting the user input involves detecting multiple inputs including, for example, a selection of the source content 106 and movement of the source content 106 from the first position to the second position. In one or more embodiments, receiving the user input involves receiving multiple movement inputs between the first and second positions within the destination image 104.

As shown in FIG. 3, the method 300 further includes an act 350 of displaying the source content 106 at the second position within the destination image by rescaling the source content to correspond to a size of a second object of the plurality of detected objects. For example, in one or more embodiments, displaying the source content 106 involves displaying, by the at least one processor and within the graphical user interface of the image editing application, the source content at the second position within the destination image, wherein displaying the source content at the second position comprises rescaling the source content to correspond to a size of a second object of the plurality of detected objects, wherein the second object is associated with the second position.

In one or more embodiments, the method 300 involves displaying the source content 106 at the second location while preventing the source content from interfering with the protected region of the destination image 104 similar to one or more embodiments with regard to displaying the source content 106 at the first location. Additionally, in one or more embodiments, the method 300 involves rescaling the source content based on a size and position of the second object similar to one or more embodiments with regard to scaling the source content 106 based on a size and position of the first object.

As mentioned above, FIG. 4 illustrates a flowchart of an exemplary method 400 for scaling and masking content that is combined within a digital image. In particular, as shown in FIG. 4, the method 400 includes an act 410 of identifying a cutout (e.g., source content 106) of a source image 102 to use in modifying a destination image 104. In one or more embodiments, the cutout includes a face 108. Alternatively, the cutout can include any number of detected objects.

Additionally, as shown in FIG. 4, the method 400 includes an act 420 of detecting a plurality of faces 210 within the destination image 104. For example, in one or more embodiments, detecting the plurality of faces 210 includes detecting, by the at least one processor, a plurality of faces 110 within the destination image 104. Additionally or alternatively, in one or more embodiments, the method 400 includes detecting any number of other objects within the destination image 104.

As shown in FIG. 4, the method 400 further includes an act 430 of displaying the cutout at a first position within the destination image by scaling the cutout to correspond to a size of a first detected face of the plurality of detected faces that is close to the first position. For example, in one or more embodiments, displaying the cutout at the first position includes displaying, by the at least one processor and within a graphical user interface of an image editing application, the cutout at a first position within the destination image. Displaying the cutout at the first position further includes scaling the cutout to correspond to a size of a first detected face of the plurality of detected faces, the first detected face including the closest of the plurality of detected faces to the first position.

As shown in FIG. 4, the method 400 further includes an act 440 of detecting a user input comprising a selection and movement of the cutout within the destination image 104 away from the first position and toward a second position. For example, in one or more embodiments, detecting the user input involves detecting a user input comprising a selection and movement of the cutout within the destination image 104, the movement causing the face 108 of the cutout to move away from the first position and toward a second position within the destination image 104. In one or more embodiments, detecting the user input causing the relocation of the cutout involves a user selection of the cutout and a movement along a path between the first position and the second position.

As shown in FIG. 4, in response to detecting the movement of the cutout away from the first position and toward the second position, the method 400 includes an act 450 of rescaling the cutout to correspond to a size of a second detected face of the plurality of detected faces 110, the second detected face comprising the closest of the plurality of detected faces 110 to the second position. For example, in response to detecting the movement of the cutout away from the first position and toward the second position, the rescaling the cutout involves rescaling, by the at least one processor, the size of the cutout to correspond to a size of a second detected face of the plurality of detected faces 110, the second detected face including the closest of the plurality of detected faces 110 to the second position.

In one or more embodiments, rescaling the cutout is performed while the cutout moves away from the first position and toward the second position. Additionally, in one or more embodiments, rescaling the cutout involves rescaling the cutout to correspond to a size between the size of the first detected face and the size of the second detected face. Further, in one or more embodiments, rescaling the cutout involves rescaling the cutout based on a relative position of the cutout between the first detected object and the second detected object.

Moreover, in one or more embodiments, the method 400 includes detecting one or more additional faces of the plurality of faces 110 positioned between the first detected face and the second detected face. Further, in one or more embodiments, rescaling the cutout involves rescaling the cutout to correspond to a size of at least one of the one or more additional faces positioned between the first detected face and the second detected face. For example, in one or more embodiments, rescaling the cutout involves rescaling the cutout based on a combination of the sizes of the first detected face, second detected face, and/or one or more of the additional faces of the plurality of faces 110.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In one or more embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural marketing features and/or methodological acts, it is to be understood that the subject matter defined in the appended claims is not necessarily limited to the described marketing features or acts described above. Rather, the described marketing features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as an un-subscription model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing un-subscription model can be composed of various characteristics such as, for example, on-demand self-service, broad network access, resource pooling, rapid elasticity, measured service, and so forth. A cloud-computing un-subscription model can also expose various service un-subscription models, such as, for example, Software as a Service ("SaaS"), Platform as a Service ("PaaS"), and Infrastructure as a Service ("IaaS"). A cloud-computing un-subscription model can also be deployed using different deployment un-subscription models such as private cloud, community cloud, public cloud, hybrid cloud, and so forth. In this description and in the claims, a "cloud-computing environment" is an environment in which cloud computing is employed.

Figure 5:
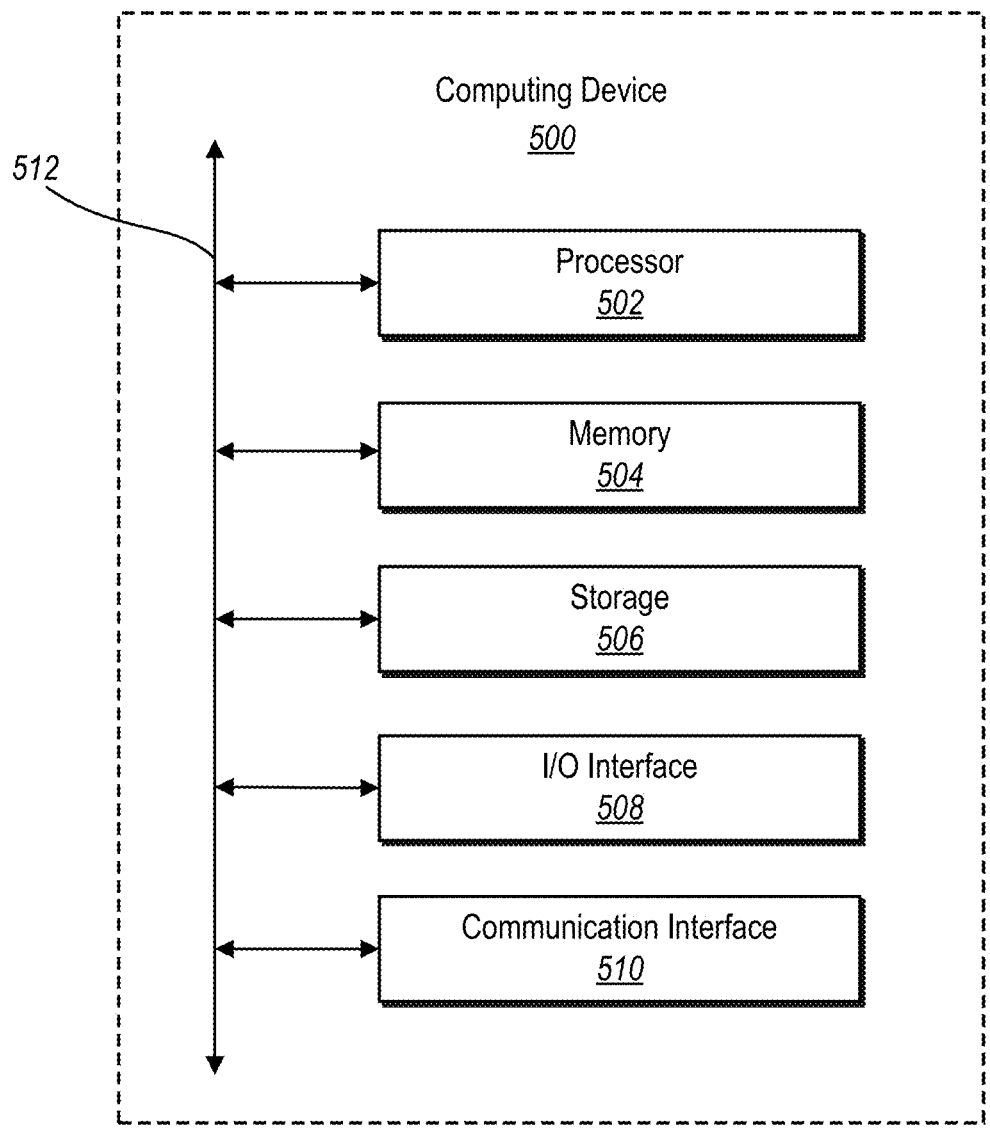
FIG. 5 illustrates a block diagram of a computing device in accordance with one or more embodiments.

FIG. 5 illustrates a block diagram of exemplary computing device 500 that may be configured to perform one or more of the processes described above. One will appreciate that computing device 500 may be implemented by one or more computing devices such as computing device 200 described above in connection with FIG. 2. As shown by FIG. 5, computing device 500 can comprise processor 502, memory 504, storage device 506, I/O interface 508, and communication interface 510, which may be communicatively coupled by way of communication infrastructure 512. While an exemplary computing device 500 is shown in FIG. 5, the components illustrated in FIG. 5 are not intended to be limiting. Additional or alternative components may be used in other embodiments. Furthermore, in certain embodiments, computing device 500 can include fewer components than those shown in FIG. 5. Components of computing device 500 shown in FIG. 5 will now be described in additional detail.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage device 506 and decode and execute them. In particular embodiments, processor 502 may include one or more internal caches for data, instructions, or addresses. As an example and not by way of limitation, processor 502 may include one or more instruction caches, one or more data caches, and one or more translation lookaside buffers (TLBs). Instructions in the instruction caches may be copies of instructions in memory 504 or storage 506.

Memory 504 may be used for storing data, metadata, and programs for execution by the processor(s). Memory 504 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 504 may be internal or distributed memory.

Storage device 506 includes storage for storing data or instructions. As an example and not by way of limitation, storage device 506 can comprise a non-transitory storage medium described above. Storage device 506 may include a hard disk drive (HDD), a floppy disk drive, flash memory, an optical disc, a magneto-optical disc, magnetic tape, or a Universal Serial Bus (USB) drive or a combination of two or more of these. Storage device 506 may include removable or non-removable (or fixed) media, where appropriate. Storage device 506 may be internal or external to computing device 500. In particular embodiments, storage device 506 is non-volatile, solid-state memory. In other embodiments, Storage device 506 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 508 allows a user to provide input to, receive output from, and otherwise transfer data to and receive data from computing device 500. I/O interface 508 may include a mouse, a keypad or a keyboard, a touch screen, a camera, an optical scanner, network interface, modem, other known I/O devices or a combination of such I/O interfaces. I/O interface 508 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interface 508 is configured to provide graphical data to a display for presentation to a user. The graphical data may be representative of one or more graphical user interfaces and/or any other graphical content as may serve a particular implementation.

Communication interface 510 can include hardware, software, or both. In any event, communication interface 510 can provide one or more interfaces for communication (such as, for example, packet-based communication) between computing device 500 and one or more other computing devices or networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 510 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 510 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 510 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 512 may include hardware, software, or both that couples components of computing device 500 to each other. As an example and not by way of limitation, communication infrastructure 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more acts or the acts may be performed in differing orders. Additionally, the acts described herein may be repeated or performed in parallel with one another or in parallel with different instances of the same or similar acts. The scope of the invention is, therefore, indicated by the appended claims rather than by the foregoing description. All changes that come within the meaning and range of equivalency of the claims are to be embraced within their scope.

What is claimed is:

1. In a digital medium environment for editing digital images, a method for intelligently adding content to a digital image, the method comprising:
    identifying source content to be added to a destination image, the source content comprising an identified object;
    identifying, by at least one processor and within the destination image, one or more protected regions of the destination image, the one or more protected regions of the destination image comprising a plurality of detected objects; and
    displaying, by the at least one processor and within a graphical user interface of an image editing application, the source content at a first position within the destination image, wherein displaying the source content at the first position comprises:
    preventing the source content from interfering with the one or more protected regions of the destination image;
    determining that a first object of the plurality of detected objects is the closest of the plurality of detected objects to the first position; and
    scaling the source content to correspond to a size of the first object of the plurality of detected objects by sizing the source content based on the size of the first object and a relative position between the first object and the first position.

2. The method as recited in claim 1, further comprising displaying, by the at least one processor and within the graphical user interface of the image editing application, the source content at a second position within the destination image, wherein displaying the source content at the second position comprises resealing the source content to correspond to a size of a second object of the plurality of detected objects based on a determination that the second object is associated with the second position.

3. The method as recited in claim 2, further comprising detecting a user input causing a relocation of the source content from the first position within the destination image to the second position within the destination image, wherein displaying the source content at the second position comprises displaying the source content at the second position in response to detecting the user input causing the relocation of the source content from the first position within the destination image to the second position within the destination image.

4. The method as recited in claim 1, wherein identifying the one or more protected regions of the destination image comprises generating a binary mask image representing the plurality of detected objects.

5. The method as recited in claim 1, wherein identifying the one or more protected regions of the destination image comprises:
    identifying a plurality of faces and associated upper bodies of people within the destination image; and
    classifying the plurality of faces and associated upper bodies of people within the destination image as protected content of the destination image.

6. The method as recited in claim 1, further comprising:
    determining that a portion of the source content at the first position overlaps a portion of the one or more protected regions of the destination image; and
    masking the portion of the source content that overlaps the portion of the one or more protected regions.

7. The method as recited in claim 6, further comprising providing a selectable option to override the masking of the portion of the source content.

8. The method as recited in claim 7, further comprising:
    receiving a selection of the selectable option to override the masking of the portion of the source content; and
    in response to receiving the selection of the selectable option, displaying the portion of the source content.

9. The method as recited in claim 6, further comprising:
    identifying, within the portion of the one or more protected regions that overlaps the portion of the source content, multiple sections corresponding to multiple respective objects of the plurality of detected objects; and
    providing, for each of the multiple sections, a selectable option to override the masking of the source content.

10. The method as recited in claim 9, further comprising:
    receiving a selection of a first selectable option corresponding to a first section of the multiple sections of a protected region; and
    in response to receiving the selection of the first selectable option, displaying a corresponding portion of the source content that overlaps the first section.

11. The method as recited in claim 1, wherein scaling the source content comprises scaling the source content such that the identified object of the source content has a size corresponding to the size of the first object of the plurality of detected objects.

12. The method as recited in claim 1, wherein scaling the source content comprises scaling the source content based on a Euclidean distance between the identified object of the source content and the first object of the plurality of detected objects.

13. The method as recited in claim 1, wherein scaling the source content comprises scaling the source content based on a difference in horizontal position between the identified object of the source content and the first object of the plurality of detected objects.

14. In a digital medium environment for editing digital images, a method for modifying and scaling content within a digital image, comprising:
   identifying a cutout of a source image to be added to a destination image, the cutout of the source image comprising a face;
   detecting, by at least one processor, a plurality of faces within the destination image;
   displaying, by the at least one processor and within a graphical user interface of an image editing application, the cutout at a first position within the destination image, wherein displaying the cutout at the first position comprises scaling the cutout to correspond to a size of a first detected face of the plurality of detected faces based on a determination that, the first detected face is the closest of the plurality of detected faces to the first position;
   detecting a user input comprising a selection and movement of the cutout within the destination image, the movement causing the face of the cutout to move away from the first position and toward a second position within the destination image;
   in response to detecting the movement of the cutout away from the first position and toward the second position, rescaling, by the at least one processor, the size of the cutout to correspond to a size of a second detected face of the plurality of detected faces based on a determination that the second detected face is the closest of the plurality of detected faces to the second position.

15. The method as recited in claim 14, wherein detecting the user input comprising the selection and the movement of the cutout comprises a user selection of the cutout and a movement along a path between the first position and the second position.

16. The method as recited in claim 14, wherein rescaling the size of the cutout is performed while the cutout moves away from the first position and toward the second position.

17. The method as recited in claim 14, wherein rescaling the size of the cutout comprises rescaling the size of the cutout to correspond to a size between the size of the first detected face and the size of the second detected face.

18. The method as recited in claim 17, wherein rescaling the size of the cutout to the size between the size of the first detected face and the size of the second detected face comprises rescaling the size of the cutout based on a relative position of the cutout between a first detected object and a second detected object.

19. The method as recited in claim 14, further comprising:
   detecting one or more additional faces of the plurality of faces positioned between the first detected face and the second detected face;
   wherein rescaling the size of the cutout further comprises rescaling the size of the cutout to correspond to a size of at least one of the one or more additional faces positioned between the first detected face and the second detected face.

20. A computing device comprising:
   at least one processor; and
   a non-transitory computer-readable medium storing instructions thereon that, when executed by the at least one processor, cause the computing device to:
   identify source content to be added to a destination image, the source content comprising an identified object;
   identify, within the destination image, one or more protected regions of the destination image, the one or more protected regions of the destination image comprising a plurality of detected objects;
   display, within a graphical user interface of an image editing application, the source content at a first position within the destination image, wherein displaying the source content at the first position comprises:
   preventing the source content from interfering with the one or more protected regions of the destination image;
   determining that a first object of the plurality of detected objects is the closest of the plurality of detected objects to the first position; and
   scaling the source content to correspond to a size of the first object of the plurality of detected objects by sizing the source content based on a size of the first object and a relative position between the first object and the first position; and
   display, within the graphical user interface of the image editing application, the source content at a second position within the destination image, wherein displaying the source content at the second position comprises resealing the source content to correspond to a size of a second object of the plurality of detected objects based on a determination that the second object is associated with the second position.

* * * * *